Aug. 9, 1949.  L. D. KLEISS  2,478,197
VALVE
Filed Sept. 28, 1945
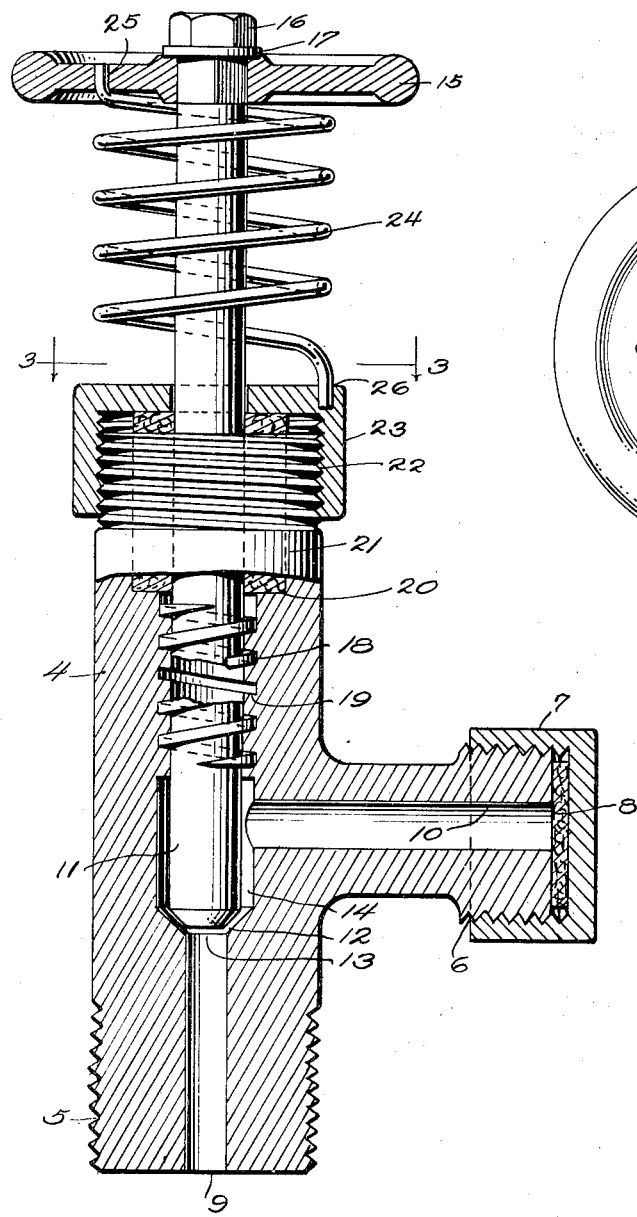
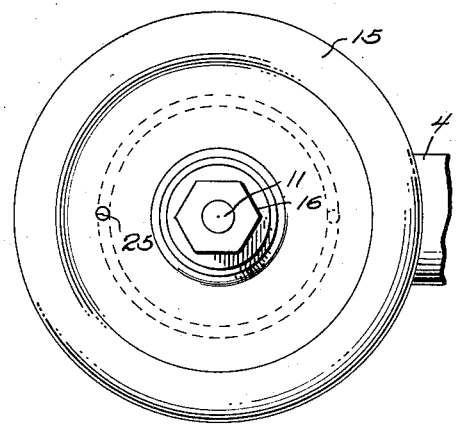
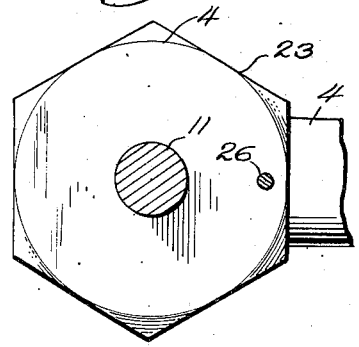
INVENTOR.
Louis D. Kleiss
BY
William F. Desmond
ATTORNEY Patented Aug. 9, 1949

2,478,197

UNITED STATES PATENT OFFICE 2,478,197

VALVE

Louis D. Kleiss, United States Army, Seattle, Wash.

Application September 28, 1945, Serial No. 619,273

7 Claims. (Cl. 251—163)

(Granted under the act of March 3, 1883, as amended April 30, 1928; 370 O. G. 757)

The invention described herein, if patented may be manufactured and used by or for the Government for governmental purposes, without the payment to me of any royalty thereon.

My invention relates, generally, to globe or needle type valves and it has particular relation to such valves which are manually operable.

Fluid pressure on the underside of a conventional globe or needle valve exerts a force tending to raise the valve stem. In the prior valves, friction alone holds this force in check. This friction may be overcome by vibration or accident resulting in undesired opening of the valve. Fluid pressure within the valve body, which may be caused by leakage past the valve orifice or by entrapment of liquified gas, is dependent upon the constriction of the valve outlet either by a sealing cap or other means of closure, and when such means is present, the internal pressure tends to raise the stuffing box cap or packing nut, and the packing is loosened.

Shrinkage of the packing due to age or other cause also promotes seepage of the fluid or gas.

The likelihood of such accidental opening in a valve is undesirable, especially with valves installed on cylinders containing compressed gases in liquid form. Such cylinders are subject to long storage and the shocks of transportation. The vibration of any kind usually causes small leaks which are not only objectionable from loss of the gases themselves but are also dangerous when such gases are inflammable and are combustion-forming.

My invention obviates present difficulties encountered by the use of such valves as are now used by the trade and accomplishes not only a saving of fluid or gases but also provides a safety factor which is desirable in present day operations.

An object of my invention is to prevent accidental opening of a globe or needle type valve.

Another object is to provide a force in a globe or needle type valve installed on a pressure vessel which opposes the force exerted on the valve stem tending to open the same.

Still another object is to apply a constant torque to the valve stem of a globe or needle type valve installed on a pressure vessel which opposes the force exerted on the valve stem through the threads thereof tending to turn the same toward the open position.

Other objects of my invention will, in part, be obvious and in part appear hereinafter.

My improvements will be undestood by reference to the annexed drawing, in which

Figure 1 is a vertical sectional view of my improved valve, the valve stem being shown in elevation; Figure 2 is a plan view of Figure 1; and Figure 3 is a sectional view taken along the line 3—3 of Figure 1.

Referring now more particularly to the accompanying drawing, the numeral 4 designates the valve casing supplied with the usual threaded shank 5 for insertion into a cylinder or the like, and with a threaded shank 6. The shank 6 is shown with a threaded closure nut 7 having an inner liner or facing 8 forming a protection cap of conventional construction.

The valve casing 4 is provided with an inlet port 9 and an outlet port 10. A valve stem 11, of a spindle and screw type, is adapted at its lower end within the chamber 14 to fit into a valve seat 12 formed in an opening 13 of the inlet port 9. The valve stem has at its upper end, a squared portion for attaching and securing an ordinary handwheel 15 which may be held in place by a nut 16 and a washer 17, in the usual manner. The valve stem 11 is provided with a quick-pitch screw-threaded portion 18 fitting into a female screw 19 in the bore of the casing 4. Conventional packing material 20 is fitted into a packing gland 21 within the valve casing 4.

The valve casing 4 has a threaded shank 22 at its other end opposite from the threaded shank 5 upon which is threaded a packing nut 23. Attention is directed to the fact that the threads, of the packing nut 23 and the shank 22 upon which it is threaded, are opposite to those threads of the portion 18 of the stem 11 and its female screw 19, wherein if the former is threaded to the right then the latter is to be threaded left or vice versa, as is more convenient in the method of manufacture.

The handwheel 15, which constitutes the manual operating means for the valve, is interconnected with the packing nut 23 by a torsion spring 24, one end of which is anchored in an opening 25 in the handwheel 15 while the opposite end is anchored in an opening 26 of the packing nut 23. The spring 24 is so bent at each of its ends that they can be inserted into the openings 25 and 26, as shown in the drawing. The torsion spring 24 is at all times under compression when inserted in the openings 25 and 26. Thus, the spring ends are held in place, and at the same time the spring 24 is under a torsion stress thereby urging clockwise rotation of the stem 11 and counter-clockwise rotation of the packing nut 23, or counter-clockwise and clockwise, respectively, dependent on the right or left hand threadings of the various elements heretofore mentioned.

In operation the valve is inserted into a cylinder and the handwheel is tightened to seat the valve stem into the valve seat to prevent the escape of the fluid or gas within the cylinder. The packing nut also is held in tight relationship to the valve casing and also creates a gas-tight bond with the packing material so that no gas or fluid can escape through the valve at its opening covered by the packing nut. In storage or shipment, if the cylinder should be subject to vibration or shock thereby loosening the handwheel, the packing nut would be tightened still more by the action of the torsion spring and also if the packing material, by shrinkage or by loosening of its mass, should become less firm or less tight and so loosen the packing nut, the torsion spring will then exert its force and tighten the packing nut onto the valve casing which in turn compresses the packing material to prevent gas or fluid from escaping. The force exerted by the pressure of the gas or liquid within the cylinder is also counteracted by the above arrangement of elements to regulate the valve and prevent any escape or wastage of gas or fluid.

It is thought that from the foregoing, the construction, operation, and the many advantages of my valve will be fully comprehended. It is obvious, however, that the details of construction may be varied without departing from the spirit of the invention and therefore it is to be understood that all matters set forth hereinbefore or shown on the accompanying drawing shall be interpreted as illustrative and not in a limiting sense.

I claim:

1. In combination with a valve and its casing, a threaded valve stem associated with the valve, an oppositely threaded packing nut on the valve casing and through which the valve stem extends, a torsionally-stressed spring compressed and coiled about the valve stem and having its ends fixed to the valve stem and packing nut whereby the spring will tend to simultaneously maintain the packing nut in sealing position and the valve in closed position.

2. In combination with a valve and its casing, a right-threaded valve stem associated with the valve, a left-threaded packing nut on the valve casing and through which the valve stem extends, a torsionally-stressed spring compressed and coiled to the right about the valve stem and having its ends fixed to the valve stem and packing nut whereby the spring will tend to rotate the packing nut to the left to sealing position and the valve stem to the right to maintain the valve in closed position.

3. In combination with a valve and its casing, a threaded valve stem associated with the valve, a handwheel fitted to the valve stem, an oppositely threaded packing nut on the valve casing and through which the valve stem extends, a torsionally-stressed spring compressed and coiled about the valve stem and having its ends fixed to the valve stem in the handwheel and packing nut whereby the spring will tend to simultaneously maintain the packing nut in sealing position and the valve in closed position.

4. In combination with a valve and its casing, a right-threaded valve stem associated with the valve, a left-threaded packing nut on the valve casing and through which the valve stem extends, a torsionally-stressed spring compressed and coiled to the right about the valve stem and having its ends fixed to the valve stem and packing nut whereby the spring will tend to rotate the packing nut in a counter-clockwise direction to sealing position and the valve stem in a clockwise direction to maintain the valve in closed position.

5. In combination with a valve casing, a right-threaded valve stem associated with the valve, a hand wheel fitted to the valve stem, a left-threaded packing nut on the valve casing and through which the valve stem extends, a torsionally-stressed spring compressed and coiled to the right about the valve stem and having its ends fixed to the valve stem in the packing wheel and packing nut whereby the spring will tend to simultaneously maintain the packing nut in sealing position and valve in closed position.

6. In combination with a valve and valve casing, a threaded valve stem rotatable about its axis and provided with a handwheel, an oppositely threaded packing nut, packing material enclosed and compressed by the packing nut within the valve casing and surrounding the valve stem, a torsionally-stressed spring compressed and coiled about the valve stem with one end retained in the handwheel and the other end retained in the packing nut thereby urging rotation of the packing nut in one direction to compress the packing material and rotation of the valve stem in the opposite direction to promote the closure of the valve.

7. In combination with a valve and valve casing, a right-threaded valve stem rotatable about its axis and provided with a handwheel, a left-threaded packing nut, packing material enclosed and compressed by the packing nut within the valve casing and surrounding the valve stem, a torsionally-stressed spring compressed and coiled to the right about the valve stem with one end retained in the handwheel and the other end retained in the packing nut thereby urging counter-clockwise rotation of the packing nut to compress the packing material and clockwise rotation of the valve stem to promote the closure of the valve.

LOUIS D. KLEISS.

REFERENCES CITED

The following references are of record in the file of this patent:

UNITED STATES PATENTS

| Number | Name | Date |
| --- | --- | --- |
| 166,483 | Stillson | Aug. 10, 1875 |
| 216,627 | Moore | June 17, 1879 |
| 1,064,305 | Fisher | June 10, 1913 |
| 1,142,145 | Collar | June 8, 1915 |
| 1,400,488 | Landgreve | Dec. 13, 1921 |
| 1,979,857 | Benson | Nov. 6, 1934 |